(12) United States Patent
Desabhatla

(10) Patent No.: US 9,771,823 B2
(45) Date of Patent: Sep. 26, 2017

(54) POWER GENERATION SYSTEM CONTROL FOLLOWING TRANSIENT GRID EVENT

(71) Applicant: General Electric Company, Schenectady, NY (US)

(72) Inventor: Sreedhar Desabhatla, Bavaria (DE)

(73) Assignee: General Electric Company, Schenectady, NY (US)

( * ) Notice: Subject to any disclaimer, the term of this patent is extended or adjusted under 35 U.S.C. 154(b) by 664 days.

(21) Appl. No.: 14/315,727

(22) Filed: Jun. 26, 2014

(65) Prior Publication Data

US 2015/0377057 A1    Dec. 31, 2015

(51) Int. Cl.

| F01D 15/10 | (2006.01) |
|---|---|
| F02C 9/26 | (2006.01) |
| G05B 15/02 | (2006.01) |
| H02J 3/24 | (2006.01) |
| H02P 9/10 | (2006.01) |
| H02J 3/38 | (2006.01) |
| H02J 3/00 | (2006.01) |

(52) U.S. Cl.
CPC .............. *F01D 15/10* (2013.01); *F02C 9/26* (2013.01); *G05B 15/02* (2013.01); *H02J 3/24* (2013.01); *H02P 9/102* (2013.01); *H02J 3/38* (2013.01); *H02J 2003/001* (2013.01)

(58) Field of Classification Search
CPC .. F01D 15/10; F02C 9/26; G05B 15/02; H02J 3/24; H02J 3/38; H02J 2003/001; H02P 9/102
See application file for complete search history.

(56) References Cited

U.S. PATENT DOCUMENTS

| 4,528,427 A | * | 7/1985 | Gadonna | ............... | H04M 3/301 |
| | | | | | 324/520 |
| 5,206,580 A | * | 4/1993 | Okamoto | ............... | H02P 9/305 |
| | | | | | 322/28 |
| 5,300,876 A | * | 4/1994 | Takagi | .................... | H02P 9/105 |
| | | | | | 322/25 |

(Continued)

FOREIGN PATENT DOCUMENTS

KR    101318124 B1    10/2013

OTHER PUBLICATIONS

International Search Report and Written Opinion issued in connection with corresponding PCT Application No. PCT/US2015/029575 dated Jul. 30, 2015.

*Primary Examiner* — Christopher E Everett
*Assistant Examiner* — Michael J Huntley
(74) *Attorney, Agent, or Firm* — Ernest G. Cusick; Frank A. Landgraff

(57) ABSTRACT

A method of controlling a power generation system following a transient grid event, and a system and controller to control the power generation system are described. The method includes sensing a rate of change of electrical frequency at terminals of a generator, determining a rate of change of shaft line acceleration, and identifying the transient grid event based on the rate of change of shaft line acceleration. The method also includes triggering an action to recover from the transient grid event when the rate of change of electrical frequency exceeds a first specified value and the rate of change of shaft line acceleration exceeds a second specified value for a specified duration.

18 Claims, 3 Drawing Sheets

(56) References Cited

U.S. PATENT DOCUMENTS

| | | | | | |
|---|---|---|---|---|---|
| 5,402,632 | A | * | 4/1995 | Nobre | F04D 27/02 60/779 |
| 5,483,147 | A | * | 1/1996 | Ilic | H02P 9/102 290/52 |
| 5,698,968 | A | * | 12/1997 | Takagi | H02P 9/105 322/25 |
| 6,216,437 | B1 | * | 4/2001 | Hepner | F01D 17/04 60/39.27 |
| 7,457,688 | B2 | * | 11/2008 | Szepek | F02C 9/42 60/39.281 |
| 7,982,325 | B2 | * | 7/2011 | Andersen | F03D 7/0284 290/43 |
| 8,946,916 | B2 | * | 2/2015 | Tarnowski | F03D 7/0276 290/44 |
| 2004/0008010 | A1 | * | 1/2004 | Ebrahim | H02P 9/04 322/44 |
| 2006/0225431 | A1 | * | 10/2006 | Kupratis | F01D 15/10 60/791 |
| 2008/0093857 | A1 | * | 4/2008 | Stiesdal | F03D 7/0284 290/44 |
| 2009/0009129 | A1 | * | 1/2009 | Markunas | H02P 9/10 318/702 |
| 2011/0062708 | A1 | * | 3/2011 | Prochaska | F02D 29/06 290/7 |
| 2011/0115444 | A1 | * | 5/2011 | Markunas | H02P 9/102 322/19 |
| 2013/0131879 | A1 | * | 5/2013 | Andresen | H02J 3/386 700/287 |
| 2013/0261820 | A1 | * | 10/2013 | Meier | H02P 9/04 700/287 |
| 2013/0320937 | A1 | * | 12/2013 | Desabhatla | H02P 9/102 322/58 |

\* cited by examiner

POWER GENERATION SYSTEM CONTROL FOLLOWING TRANSIENT GRID EVENT

BACKGROUND OF THE INVENTION

The subject matter disclosed herein relates to control of a power generation system following a transient grid event.

A power generation system includes a prime mover that generates electrical power from other primary energy sources. An exemplary prime mover, a gas turbine, is a rotary mechanical device with a gas turbine shaft that drives an electrical generator to supply electrical power to a transmission grid that supplies power to the ultimate users. Another exemplary prime mover is a steam turbine. For fault-free operation, the turbine shaft speed and resulting grid frequency must be maintained within operational ranges. When grid frequency changes abruptly due to a transient event, the turbine controller attempts to restore balance in the power generation system through control of the shaft speed.

BRIEF DESCRIPTION OF THE INVENTION

According to one aspect of the invention, a method of controlling a power generation system following a transient grid event includes sensing a rate of change of electrical frequency at terminals of a generator; determining, using a processor, a rate of change of shaft line acceleration; identifying the transient grid event based on the rate of change of shaft line acceleration; and triggering an action to recover from the transient grid event when the rate of change of electrical frequency exceeds a first specified value and the rate of change of shaft line acceleration exceeds a second specified value for a specified duration.

According to another aspect of the invention, a system to control a power generation system following a transient grid event includes a prime mover including a shaft line coupled to a generator; the generator configured to supply power to a grid; an exciter coupled to the generator; and a controller configured to sense a rate of change of electrical frequency at terminals of the generator, determine a rate of change of acceleration of the shaft line, identify the transient grid event based on the rate of change of acceleration, and trigger an action to recover from the transient grid event when the rate of change of electrical frequency exceeds a first specified value and the rate of change of acceleration exceeds a second specified value for a specified duration.

According to yet another aspect of the invention, a controller coupled to a generator in a power generation system includes an input interface configured to receive measurement data; a memory device configured to store instructions; and a processor configured to process the instructions to control the power generation system following a transient grid event based on sensing a rate of change of electrical frequency at terminals of the generator based on the measurement data, determining a rate of change of acceleration of a shaft line coupling a prime mover to the generator, identifying the transient grid event based on the rate of change of acceleration, and triggering an action to recover from the transient grid event when the rate of change of electrical frequency exceeds a first specified value and the rate of change of acceleration exceeds a second specified value for a specified duration.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As noted above, a power generation system with a prime mover includes a turbine controller to bring the system back in balance following a transient event on the grid causing a frequency deviation. As an example, when a frequency drop in the grid is detected, a drop in speed is detected because the speed moves with grid frequency. Fuel intake by the prime mover would increase based on sensing the drop in speed, which increases active power output to compensate for the drop in frequency. This may result in an increase in the electrical power beyond system limits and, consequently, shut off of fuel to the gas turbine (flame out). In addition to this, when a turbine controller, try to react to the fast grid frequency transients, it could potentially affect the Gas turbine dynamic behavior. The sequence of events occurs because of reactions to symptoms of the transient event on the grid without recognition of the transient grid event itself. Embodiments of the systems and methods detailed herein relate to recognizing the transient grid event and controlling the prime mover accordingly. Specifically, a monitoring period is implemented to ensure appropriate action rather than an overreaction to perceived conditions. While a gas turbine is specifically discussed for explanatory purposes, the embodiments described herein apply to any prime mover and are not limited based on the exemplary system.

Figure 1:
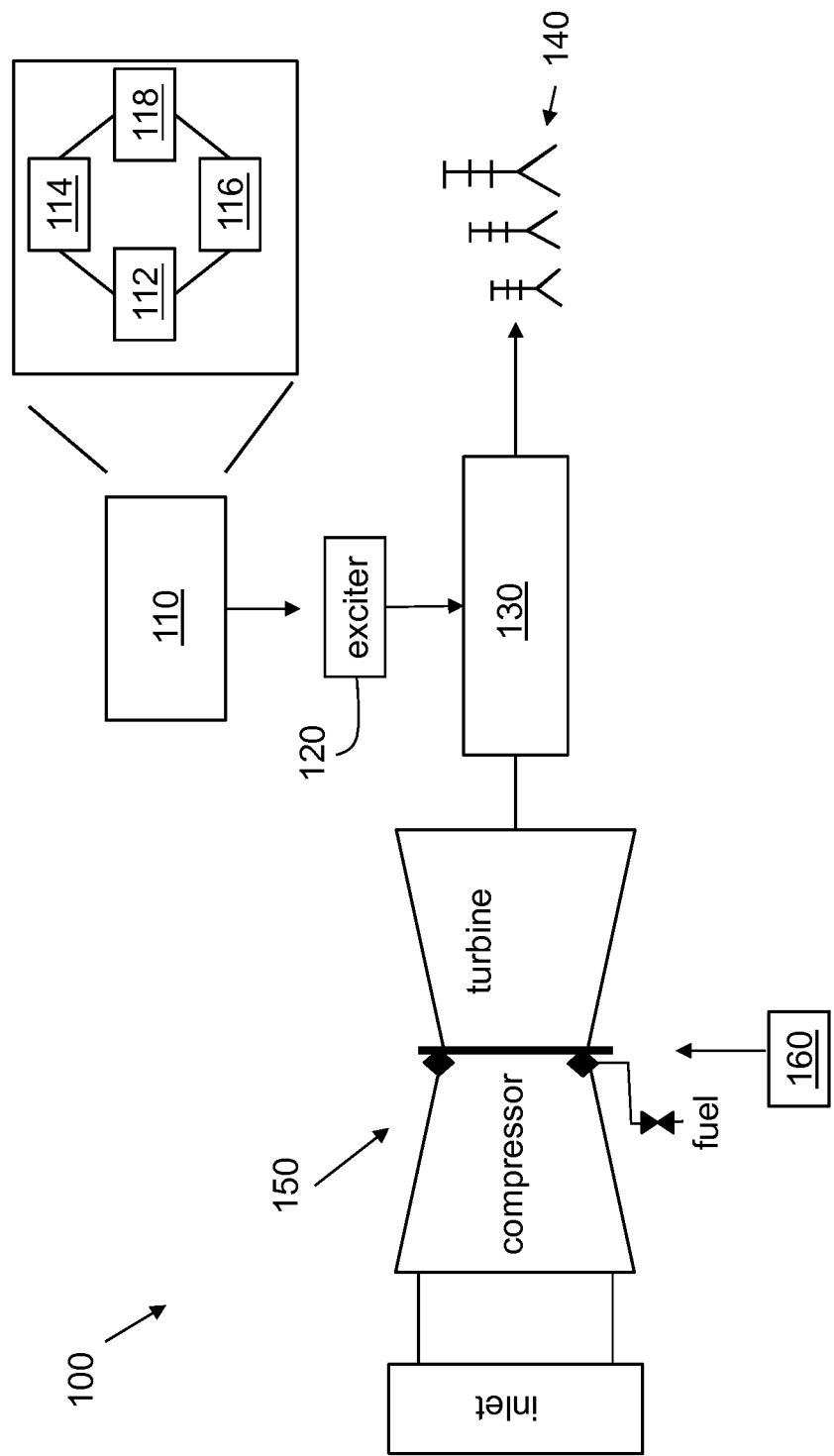
FIG. 1 is a block diagram of a power generation system including an exciter controller according to an embodiment of the invention.

FIG. 1 is a block diagram of a power generation system 100 including an exciter controller 110 according to an embodiment of the invention. The power generation system 100 includes a gas turbine 150 that couples to a generator 130 that supplies the grid 140. The gas turbine 150 is also coupled to a turbine controller 160. The generator 130 is coupled to an exciter 120 that is controlled by an exciter controller 110. The embodiments detailed herein are discussed with reference to the exciter controller 110 for explanatory purposes but may be implemented in one or more other subsystems of the power generation system 100 in alternate embodiments. The exciter controller 110 is a computing system that includes an input interface 112, an output interface 118, one or more processors 114, and one or more memory devices 116. The exciter controller 110 facilitates recognition of a transient grid event in the control of the power generation system 100 as detailed below. In alternate embodiments, a controller separate from the exciter controller 110 is used. That is, while the exciter controller 110 is specifically discussed for explanatory purposes, any controller that monitors the generator 130 and includes the functionality of the exciter controller 110 discussed with reference to embodiments of the invention may be used.

Figure 2:
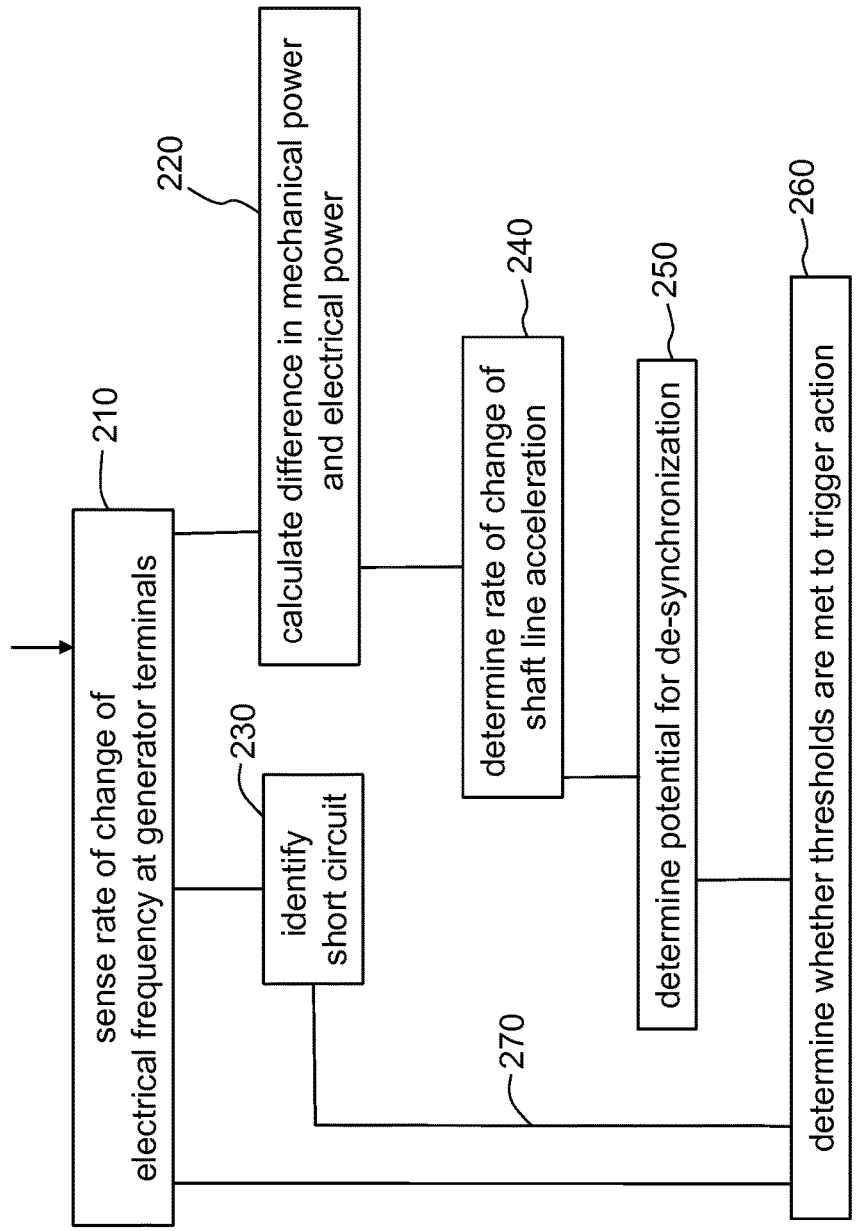
FIG. 2 is process flow of a method of controlling a gas turbine following a transient event on the grid according to embodiments of the invention.

FIG. 2 is process flow of a method of controlling a gas turbine 150 following a transient event on the grid 140 according to embodiments of the invention. As noted above, the gas turbine 150 is an exemplary embodiment of a prime mover that may be controlled according to the embodiments discussed herein. The described processes have the technical effect of facilitating recognition of a transient grid event so that the prime mover may be controlled accordingly. The transient grid event may result in a rise or fall in grid frequency and/or a rise or drop in active power or reactive power of the generator 130 and might be associated with other transient changes in other generator parameters like Voltage, current, power factor so on. Once one of these conditions is detected, the process at block 210 includes sensing the rate of change of electrical frequency at the generator 130 terminals. At block 220, calculating the difference in mechanical power (synthesized mechanical power at the gas turbine 150 side of the power generation system 100 in the case of the gas turbine 150) and electrical power (on the grid 140 side of the power generation system 100) is further discussed with reference to FIG. 3. The processes at blocks 210 and 220 may be performed by the exciter controller 110 or, in alternate embodiments, another controller or subsystem of the power generation system 100. At block 240, determining the rate of change of shaft line acceleration is based on the difference in mechanical power (synthesized mechanical power) and electrical power (block 220) and is also detailed with reference to FIG. 3. At block 250, determining the potential for de-synchronization of the power generation system 100 includes synthesizing the integral of accelerating power of the shaft line (determined at block 240) associated with high rate of change of frequency (sensed at block 210). This determination facilitates recognition of the transient grid event rather than merely a reaction to the change of shaft speed by the gas turbine controller 160. Processing at block 260 is discussed below. First, the process at block 230, which may override the process at block 260, is discussed. At block 230, identifying a short circuit (with the exciter controller 110, for example) includes determining if there is a drop in the terminal voltage and a rise in reactive current. When a short circuit is identified based on the terminal voltage and reactive current, an override signal 270 is issued to prevent any action from being triggered at block 260.

At block 260, determining whether the thresholds are met to trigger action includes determining whether the rate of change of shaft line acceleration (block 240) exceeds a specified value and whether rate of change of electrical frequency at the generator 130 terminals (block 210) is greater than a specified frequency rate for a specified time or number of cycles. For example, the thresholds may be a threshold for the rate of change of shaft line acceleration given by:

$$\frac{d}{dt}|P_m - P_e| > 0.1 \frac{PU}{\text{second}} \qquad [\text{EQ. 1}]$$

Pm is the mechanical power, Pe is the electrical power, and the specified value 0.1 PU is a percentage of the full load (1 PU) of the generator 130. The threshold for the rate of change of electrical frequency at the generator 130 terminals is given by:

$$\left|\frac{df}{dt}\right| > 0.5 \frac{\text{Hz}}{\text{second}} \qquad [\text{EQ. 2}]$$

f is the frequency and the specified frequency rate is in Hertz (Hz) per second (s). The exemplary thresholds may have to be exceeded for 3-7 consecutive cycles, for example, before action is initiated. In the exemplary case of a 60 Hz system, a cycle is approximately 16 milliseconds (ms), and the threshold may have to be exceeded for 5 cycles, for example. The (threshold) number of cycles may be based on the configuration of the gas turbine 150 (prime mover). For example, the threshold rate of change of shaft line acceleration and threshold rate of change of electrical frequency may have to be exceeded for a shorter duration for a multi-shaft system than for a single shaft system before action is initiated. The exemplary threshold values are provided for explanatory purposes only. The threshold values may be provided by the grid 140 authority or obtained in other ways, and the exemplary threshold values do not limit the thresholds that may be used to ensure that reactionary (wrong) action is not taken too soon in the gas turbine 150. Once the threshold requirements are met for the specified duration at block 260, then the exciter controller 110, turbine controller 160, a combination of the two, and other control subsystems of the power generation system 100 may be used to perform a number of actions. For example, the turbine controller 160 may preposition the gas turbine 150 to avoid trips or other major events such as a compressor surge by prepositioning the fuel system (fuel stroke reference (FSR) and nozzles), or prepositioning the inlet guide vanes (IGV), or combustion chamber. Also, in alternate embodiments, other parameters of the generator 130 may be used to evaluate the transient grid event. For example, reactive power, field current, stator current, stator voltage, or load angle (included in the exemplary embodiment above) may be used.

Figure 3:
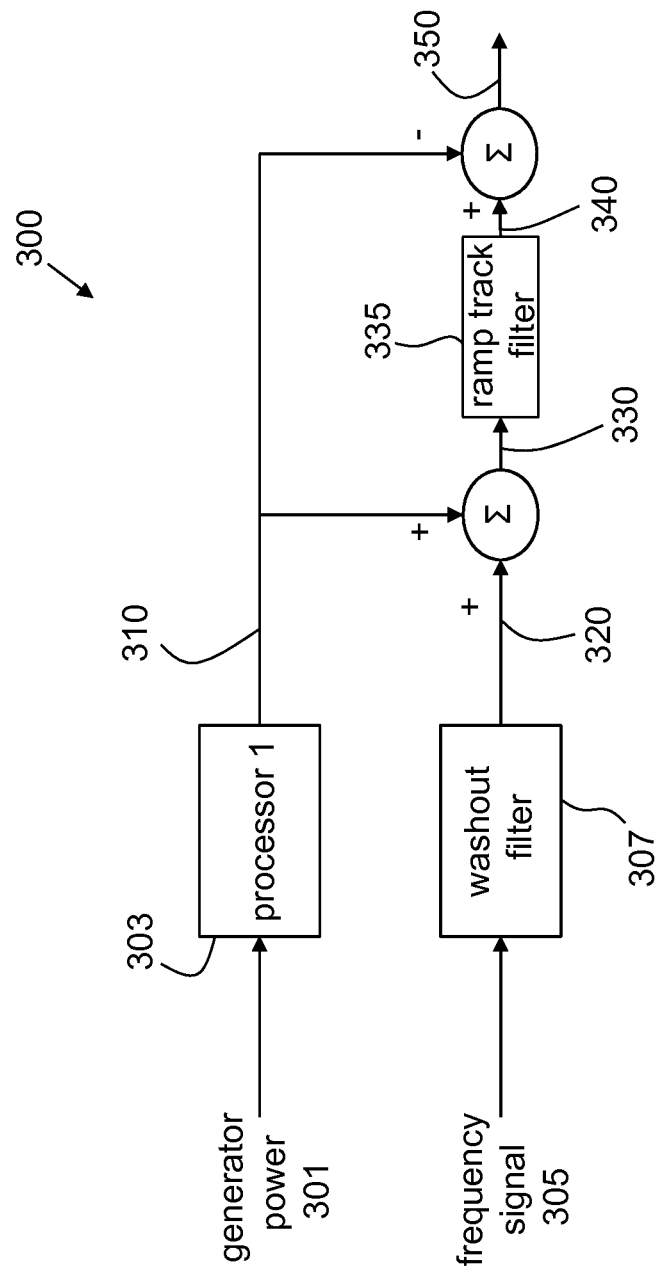
FIG. 3 is a process flow of computing the rate of change of shaft line acceleration in the gas turbine according to an embodiment of the invention.

FIG. 3 is a process flow 300 of computing the rate of change of shaft line acceleration in the gas turbine 150 according to an embodiment of the invention. Generator 150 power (typically in mega Watts (MW)) 301 is put through a known processor 303. The processor 303 includes a washout filter or low-pass filter to filter out high frequency transient events, which are not of interest, an integration block, and a divider (by system inertia). Specifically, the processor 303 output 310 is given by:

$$\int \frac{Pe}{2H} dt \qquad [\text{EQ. 3}]$$

The inertia is given by H.

Frequency Signal 305 (speed of the gas turbine 150 shaft line) is put through a different washout filter (washout filter 307) to obtain change in speed of the shaft line (Δω) of the gas turbine 150 as washout filter output 320. The electrical power (processor output 310) and change in speed of the shaft line (washout filter output 320) are added to obtain a representation of mechanical power (Pm) of the power generation system 100. Specifically, sum output 330 is given by:

$$\int \frac{Pm}{2H} dt = \Delta\omega + \int \frac{Pe}{2H} dt \qquad [\text{EQ. 4}]$$

This sum output 330 is put through a ramp track filter 335 to obtain the mechanical power Pm as ramp track filter output 340. A difference in mechanical power Pm and electrical power Pe is obtained as difference output 350 (discussed above with reference to block 220, FIG. 2). Specifically, difference output 350 is the integral of accelerating power (indicated by Pacc) is given by:

$$\int \frac{Pacc}{2H} dt \qquad [\text{EQ. 5}]$$

The difference in Pm and Pe contributes to the acceleration (or deceleration) of the rotor in the gas turbine 150 (result of EQ. 5). An observation of this acceleration over time to determine the rate of change provides the rate of change of shaft line accelerating power discussed above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling a power generation system following a transient grid event, the method comprising:
    sensing a rate of change of electrical frequency at terminals of a generator;
    determining, using a processor, a rate of change of shaft line acceleration;
    identifying the transient grid event based on the rate of change of shaft line acceleration; and
    triggering an action to recover from the transient grid event when the rate of change of electrical frequency exceeds a first specified value and the rate of change of shaft line acceleration exceeds a second specified value for a specified duration.

2. The method according to claim 1, wherein the determining the rate of change of shaft line acceleration is based on processing a power at the generator and a frequency signal.

3. The method according to claim 2, wherein the processing includes processing each of the power at the generator and the frequency signal to obtain processed values and further filtering a sum of the processed values.

4. The method according to claim 3, wherein the processing the power at the generator provides an integral of electrical power and the further filtering the sum provides an integral of mechanical power.

5. The method according to claim 4, further comprising determining the rate of change of shaft line acceleration based on a difference between the integral of mechanical power and the integral of electrical power.

6. The method according to claim 1, further comprising identifying a short circuit.

7. The method according to claim 6, further comprising overriding the triggering the action when the short circuit is identified.

8. A system to control a power generation system following a transient grid event, the system comprising:
    a prime mover including a shaft line coupled to a generator;
    the generator configured to supply power to a grid;
    an exciter coupled to the generator; and
    a controller configured to sense a rate of change of electrical frequency at terminals of the generator, determine a rate of change of acceleration of the shaft line, identify the transient grid event based on the rate of change of acceleration, and trigger an action to recover from the transient grid event when the rate of change of electrical frequency exceeds a first specified value and the rate of change of acceleration exceeds a second specified value for a specified duration.

9. The system according to claim 8, wherein the controller is configured to determine the rate of change of acceleration of the shaft line based on processing the power at the generator and a frequency signal.

10. The system according to claim 9, wherein the controller processes each of the power at the generator and the frequency signal to obtain processed values and further filters a sum of the processed values.

11. The system according to claim 10, wherein the controller determines an integral of electrical power based on processing the power at the generator and determines an integral of mechanical power based on filtering the sum.

12. The system according to claim 11, wherein the controller determines the rate of change of acceleration of the shaft line based on a difference between the integral of mechanical power and the integral of electrical power.

13. The system according to claim 8, wherein the controller is further configured to identify a short circuit.

14. The system according to claim 13, wherein the controller outputs an override signal to override triggering of the action when the short circuit is identified.

15. A controller coupled to a generator in a power generation system, the controller comprising:
    an input interface configured to receive measurement data;
    a memory device configured to store instructions; and
    a processor configured to process the instructions to control the power generation system following a transient grid event based on sensing a rate of change of electrical frequency at terminals of the generator based on the measurement data, determining a rate of change of acceleration of a shaft line coupling a prime mover to the generator, identifying the transient grid event based on the rate of change of acceleration, and triggering an action to recover from the transient grid event when the rate of change of electrical frequency exceeds a first specified value and the rate of change of acceleration exceeds a second specified value for a specified duration.

16. The controller according to claim 15, wherein the processor is configured to determine the rate of change of acceleration of the shaft line based on processing a power at the generator and a frequency signal.

17. The controller according to claim 15, wherein the processor is further configured to identify a short circuit.

18. The controller according to claim 17, wherein the processor issues an override signal to override triggering the action when the short circuit is identified.

\* \* \* \* \*